F. TOWNSEND.
PEANUT BLANCHING MACHINE.
APPLICATION FILED APR. 14, 1919.
1,352,702.
Patented Sept. 14, 1920.
3 SHEETS—SHEET 1.
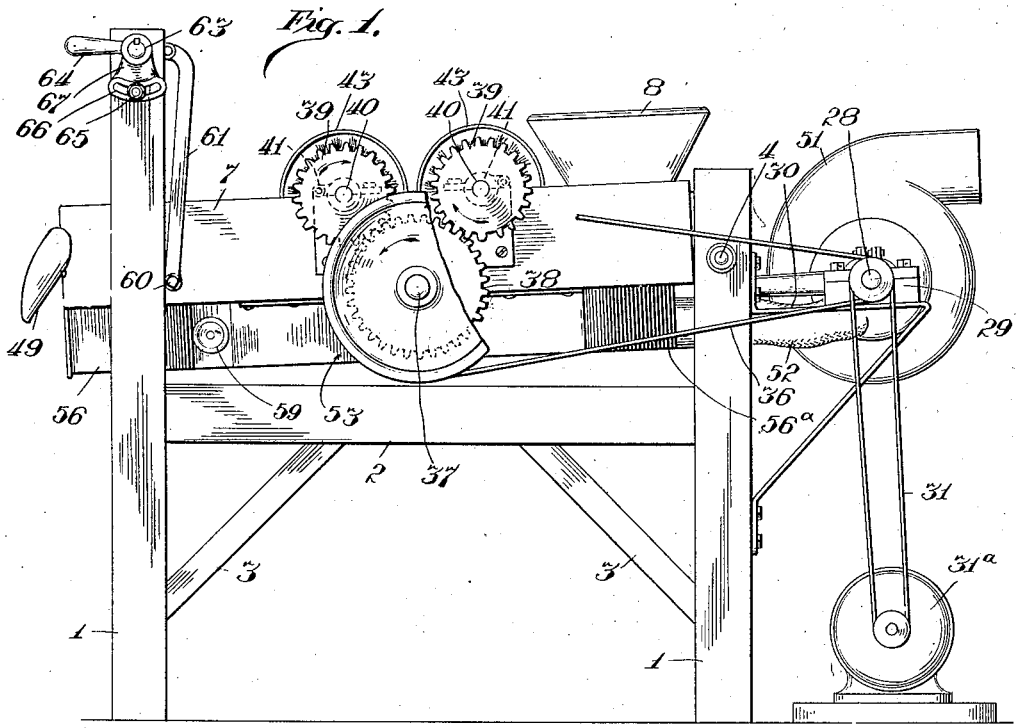
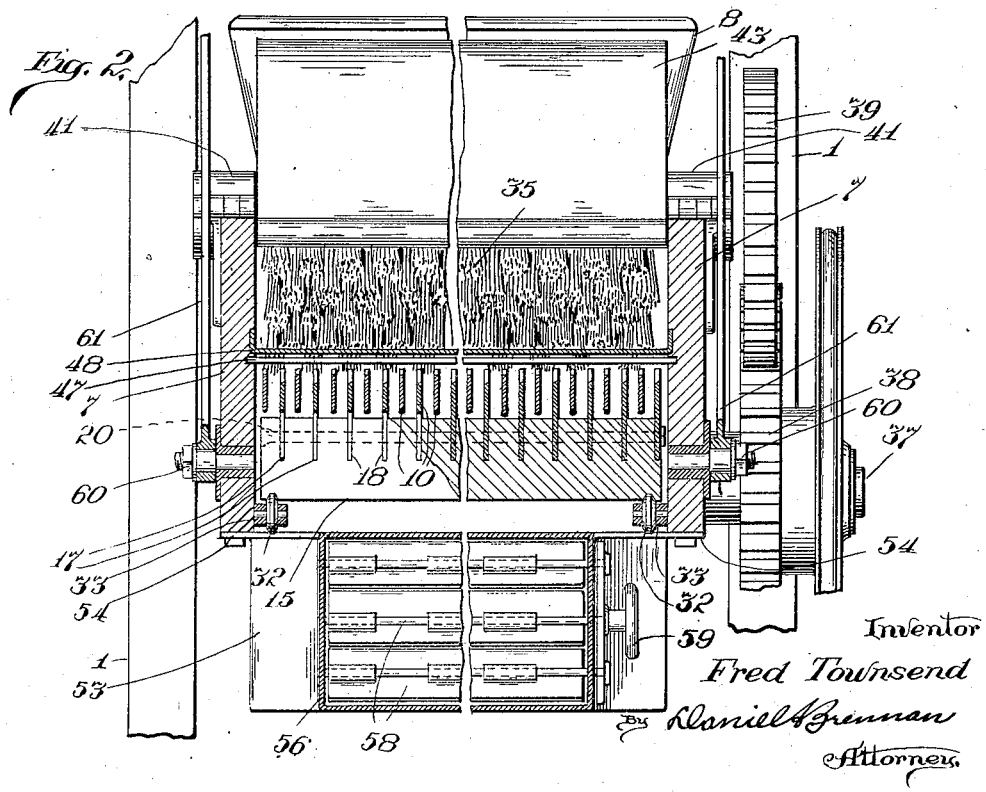
Inventor
Fred Townsend
By Daniel A Brennan
Attorney

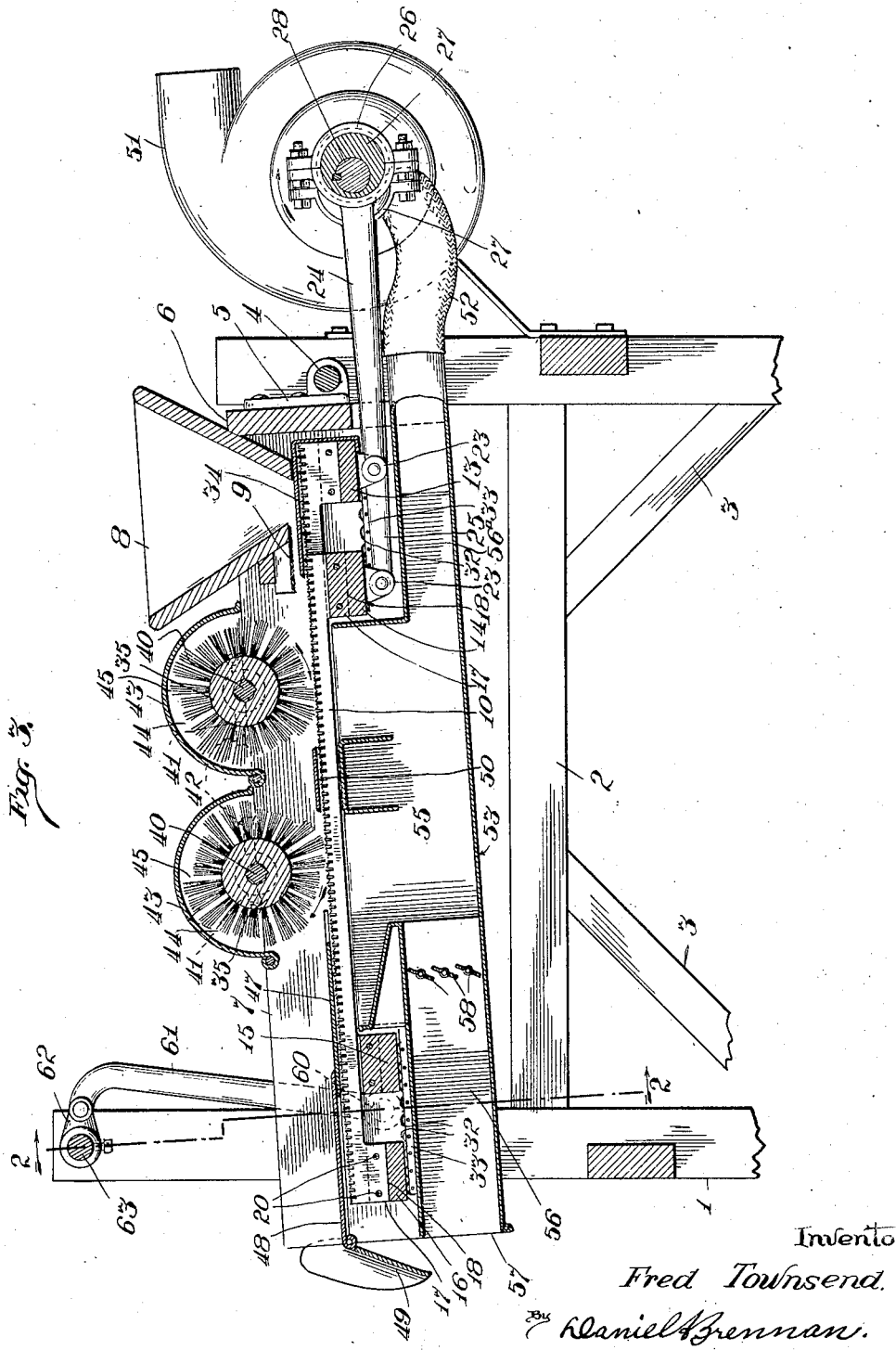

F. TOWNSEND.
PEANUT BLANCHING MACHINE.
APPLICATION FILED APR. 14, 1919.
1,352,702.
Patented Sept. 14, 1920.
3 SHEETS—SHEET 3.
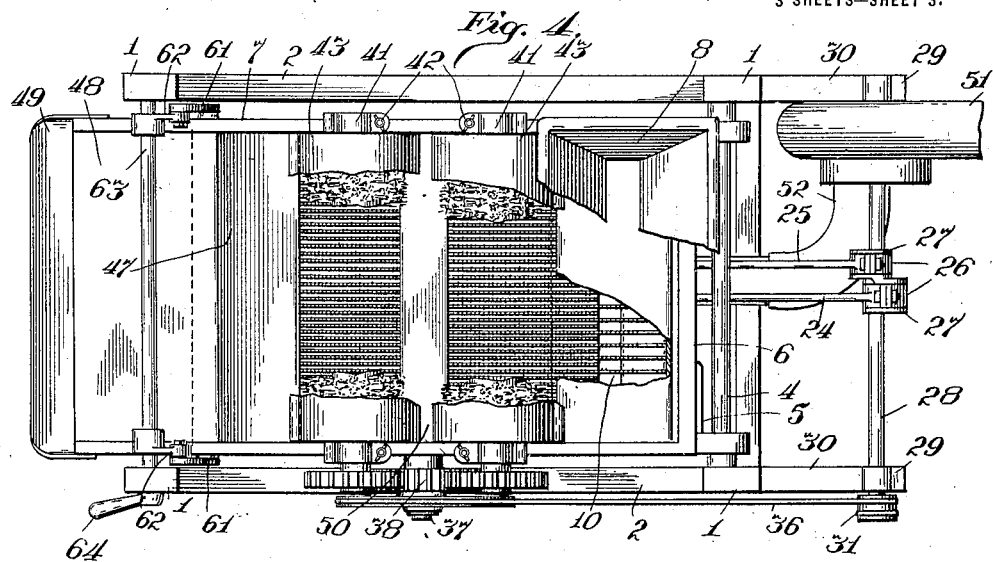
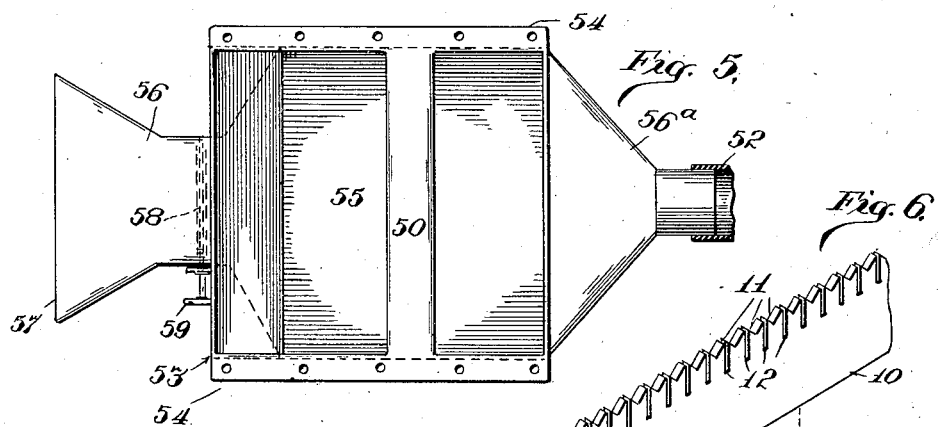
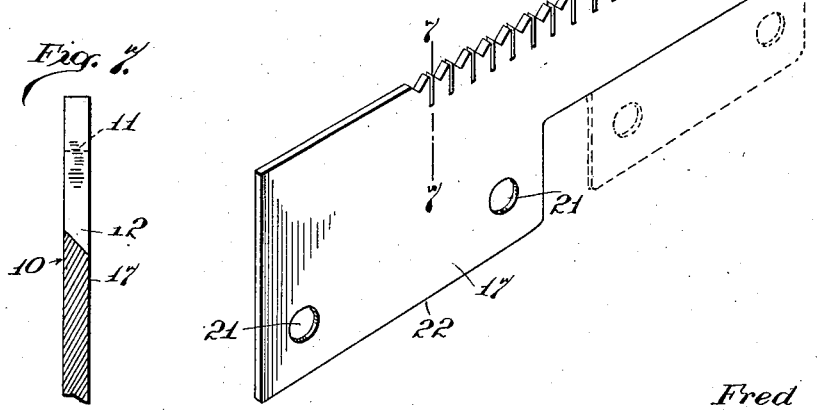
Inventor
Fred Townsend
By Daniel A. Brennan.
Attorney.

UNITED STATES PATENT OFFICE.

FRED TOWNSEND, OF CHICAGO, ILLINOIS, ASSIGNOR OF ONE-HALF TO JAMES R. RANDALL, OF CHICAGO, ILLINOIS.

PEANUT-BLANCHING MACHINE.

1,352,702.

Specification of Letters Patent.

Patented Sept. 14, 1920.

Application filed April 14, 1919. Serial No. 289,912.

*To all whom it may concern:*

Be it known that I, FRED TOWNSEND, a citizen of the United States, residing at Chicago, county of Cook, and State of Illinois, have invented certain new and useful Improvements in Peanut-Blanching Machines, of which the following is a specification.

This invention relates to a machine for blanching peanuts or similar nuts.

An object of the invention is to provide a machine in which by a continuous operation the nuts fed at one end of the machine are freed of the membrane while passing through the machine and are delivered at the other end, free of the membrane.

Another object of the invention is to provide a machine in which the membranes separated from the nuts are conveyed in a direction opposite to that in which the nuts travel, so as to be discharged adjacent the feeding end of the machine.

It is also an object of the invention to combine means for withdrawing the separated membranes by suction from the nuts, with means for detaching the membranes without breaking or splitting of the nuts.

It is furthermore an object of the invention to provide sets of rakers which move in opposite directions for the purpose of breaking the membranes from the nuts, the nuts being held in contact with the rakers partly through the air suction and partly through rotary brushes, or the like, disposed above the rakers.

It is also an object of the machine to provide in combination with rakers, brushes to which a continuous movement is imparted, but which owing to the formation of the bristles act intermittently only upon the nuts in the machine.

It is furthermore an object of the invention to arrange the brushes with respect to the rakers in such position that the bristles of the brushes will not come in actual contact with the rakers, but will merely engage the nuts to assist them in taking a rolling movement. The suction acting upon the nuts during their travel through the machine will overcome their tendency to jump or bounce off the rakers, and will also have a tendency to maintain the nuts in continuous contact with the grinding or sawing teeth of the rakers.

With these and other objects in view an embodiment of the invention is described in the following specification, reference being had to the accompanying drawings wherein:

Figure 1 is a side elevation of the complete machine.

Fig. 2 is partly an end elevation and partly a vertical section on line 2—2 of Fig. 3.

Fig. 3 is a central longitudinal vertical section through the machine.

Fig. 4 is a top plan view of the machine.

Fig. 5 is a top view of the air conduit.

Fig. 6 is a perspective view of a portion of one of the raker bars.

Fig. 7 is a detail section through a raker bar, on a larger scale, taken on line 7—7 of Fig. 6.

The machine comprises a frame which consists of pairs of uprights 1 at each end and longitudinal beams 2 connecting these pairs. Suitable braces 3 may be used for enhancing the rigidity of the frame structure.

The conveyer for the nuts is pivotally supported on a shaft 4 and extends between the uprights at the front end of the machine. The bearing brackets 5 which support the shaft 4 are connected to a head board 6 to which lateral boards 7 are secured whereby a trough shaped structure open at one end and at the bottom is formed. The nuts may be fed into the trough through a hopper 8, the discharge opening of which may be adjusted by a sliding gate 9 adjustably supported near the lower end of the hopper.

The bottom of the trough shaped structure is formed by sets of raker bars 10, which are provided at their upper edge with teeth 11, as shown in Fig. 6. These teeth may slant from their tips in opposite directions and incisions or slots 12 may extend from the tip of each tooth 11 downwardly into body of the bar 10, to provide an outlet for the nut membranes.

These rakers 10 are arranged in the present embodiment in a plurality of sets, two sets being shown by way of example. One of these sets is connected at its front end by means of a transverse beam 13, while the other set is similarly connected at the front end with another transverse beam 14. The opposite ends of the raker bars 10 are similarly connected with transverse beams 15 and 16, respectively.

From Fig. 6 it will be seen that the end portion 17 of the bars 10 are widened to project below the main or intermediate portions of these bars and the alinement of the bars 10 is attained by placing the end portions 17 of these transverse beams into slots 18. A rigid connection between these end portions 17 and the pertaining beams 13, 14, 15, 16 is accomplished by means of transverse bolts 20 which extend through the beams and through holes 21 provided in the end portions 17.

It is obvious that in this way any one of the raker bars 10 may be removed from its two supporting beams without disturbing the location of the companion bars of the same set or without disturbing the bars of the other set. The lower edges 22 of the end portions 17 advisably rest when in operative position on the bottom of the slots 18.

The members 13 and 14 each carry at their lower surfaces bearings 23 for the pivotal attachment of rods 24 and 25, respectively, the other ends of which are rotatably connected by means of the eccentric straps 26 with the eccentrics 27. The eccentrics are rigidly mounted on the shaft 28 which is supported in bearings 29 mounted on angular brackets 30 secured to the front uprights 1 of the machine.

Rotation is imparted to the shaft 28 from the motor 31ª through a belt 31 which is trained over a pulley on the motor shaft and a pulley on the shaft 28. From Figs. 3 and 4 it is also apparent that the eccentrics 27 are angularly offset with respect to each other, preferably 180°. The effect of this arrangement will be that the raker bars of each set will be moved in one direction, while the raker bars of the other set will be moved in the opposite direction. Fig. 2 shows that the raker bars of the two sets are disposed in alternate arrangements, each raker bar of the one set being adjacent and interspaced with respect to a raker bar of the other set. The opposite reciprocating movement of these raker bars has the effect of grinding or tearing the membranes from the nuts that are traveling along them.

To facilitate the movement of the two sets of raker bars, as described, the members 13, 14, 15 and 16 are supported on rollers 32 which are freely rotatable in bearing plates 33, said roller plates are supported between the lateral walls 7 of the trough structure.

The member 13 near the front end of the machine serves for supporting a sliding bottom plate 34 which reciprocates with the raker bars 10 secured to said member 13. This movable bottom plate 34 serves for facilitating the discharge of the nuts from the interior of the hopper 8, and for conveying them to the toothed surface of the raker bars.

One preferably, but more movable brushes 35 may be disposed above the raker bars 10. The brushes are rotated in the present instance by means of a belt 36 trained about a pulley on the shaft 28, and about a larger pulley on a jack-shaft 37 which also supports a gear 38. This gear is in mesh with two gears 39 fixed on the brush shafts 40. Said shafts 40 are rotatably mounted in bearings 41 which may be secured to the side boards 7. For the purpose of making the brushes removable the bearings 41 have caps which are supported at one end by means of pivot pins, while the other ends are held in operative position by latches 42, or the like. Guards 43 may be used to guard the brushes and catch the particles of the membranes which may adhere to the brushes.

Fig. 3 also shows that the bristles of the rotary brushes are not of uniform length, the sections indicated at 44 being slightly shorter than alternate section 45 of the bristles. This arrangement is made in order to increase the efficiency of the brushes in their action as beaters and transmitters for the nuts, the nuts being advanced through repeated impact of the longer sets of bristles.

It is to be noted however that neither the long bristles nor the short ones wipe against the raker bars, but remain at a distance from the same sufficient to touch the nuts only and to hold these nuts in engagement with the bars. They assist in rolling the nuts over the raker bars thereby improving the grinding or sawing action of the teeth upon the nuts. While two of these brushes are illustrated, it is obvious that one only may be used for the desired purpose, or that more than two may be utilized to the same effect.

A bottom plate 47 is secured to the side walls 7 to prevent further grinding of the kernels after being blanched. A bottom plate 48, may be connected with a discharge spout 49 which is pivotally supported at its upper end, and which may be held in suitable adjusted position by its friction with the supporting spindle.

Between the two brushes 35 the sets of raker bars are covered by a stationary plate 50 over which the nuts are advanced through the whipping action of the first brush. The blanching operation therefore may be described as being carried on intermittently, the operation being momentarily interrupted while the nuts by means of the brush 35 are carried over this stationary plate 50.

While the raker bars 10 serve for loosening the membranes from the nuts other means are provided in the machine for carrying the freed membranes away from the kernels. These means comprise a negative blower 51, which may be directly driven by the shaft 28 from which the raker bars 10 derive their reciprocating movement. The inlet of this negative blower 51 is connected by means of a flexible pipe or tubing 52 with a suction conduit, generally designated at 53. This conduit is also trough shape and may be fastened to the side walls 7 of the machine by laterally projecting plates 54 which are adjacent to the upper edge of both side walls of the trough 53. The main portion of the conduit is formed by a rectangular open box 55. This box has cylindrical rear and front extensions 56 and 56ª, respectively. The front extension 56ª terminates in a spout adapted for the attachment of the hose 52. The rear extension 56 has an enlarged air inlet 57, and between this inlet and the conduit proper a plurality of shutters 58 are provided which may be adjusted so as to regulate the volume of air which may be drawn by suction through the inlet 57 into the conduit 53. These shutters are operatively associated at the side of the conduit with a hand wheel 59, whereby their angular position may be properly adjusted and whereby introduction of air through the inlet 57 may be entirely prevented.

The negative blower 51 will draw air by suction through the interspaces between the raker bars 10 and this air will convey the membrane detached by the action of the raker bars into the conduit 53. The interspaces between the raker bars 10 may have a width of about one-sixteenth of an inch, or may be sufficiently wide to permit the passage of the membranes, but not wide enough to permit the passage of the kernels. If the shutters 58 are adjusted to closing position, the suction force will only be exerted upon the interspaces between the raker bars 10, and the kernels or nuts will then be held in such firm frictional contact with these raker bars that the air will not only cause the removal of the membranes, but will also cause the kernels to be split, where this operation should be desired. If however the shutters 58 are partly opened the under pressure or partial vacuum underneath the raker bars 10 will not be strong enough to force the nuts into firm frictional contact with the raker bars, and the kernels will not be split in their travel over these bars.

The rear end of the conveying structure combined with the conduit 53 is provided with trunnions 60, which are connected by links 61 with a crank arm 62 mounted on a shaft 63. This crank arm may be adjusted by means of the hand lever 64, whereby the rear end of the conveyer may be raised or lowered, to accelerate or retard the movement of the nuts over the raker bars. The conveyer structure is therefore pivoted about the shaft 4 but the adjustment of this structure about this shaft is so small that an additional adjustment of the belt 36 is not necessary. The structure may then be held in adjusted position by means of the lag screw 65 which passes through a segmental slot 66 in an arm 67 firmly connected with the hand lever 64.

The operation of the machine will be fully understood from the above description. The nuts are either intermittently or continuously fed into the hopper 8, the discharge opening of which may be regulated by the slide 9. They drop upon the movable bottom plate 34 through the movement of which they are advanced over the oppositely moving sets of raker bars 10. The teeth on these raker bars loosen the membranes of the nuts through a grinding or sawing action, without however splitting the nuts. The rotary brushes complete the detachment of the loosened membranes, and the detached membranes will then be withdrawn through the interspaces between the raker bars by means of the suction. If the nuts are firmly forced against the teeth of the raker bars by increase of the suction force the membrane will not only be loosened, but the sawing or grinding action of these teeth will also have the effect of breaking up or splitting the nuts. The brushes which do not come into contact with the teeth of the bars engage the nuts and impart to the same rolling movement so that practically the entire surface of the membrane is gradually subjected to the action of the teeth. A cleaning of the brushes can readily be effected by swinging open the bearing caps 41 of the shafts for the brushes, moving the guard plates 43 outwardly and removing the brushes, or making the entire surface of the brushes accessible to the attendant. The pressure with which the nuts are held in engagement with the teeth of the raker bars may be adjusted through opening or closing of the shutters 58. If the shutters are entirely closed the suction force of the blower will act only through the interspaces between the raker bars, but if these shutters are partly opened, the force of suction will be utilized partly for drawing air through the inlet 57, and this part of the force will have no effect upon the nuts.

The speed with which the nuts travel over the raker bars may also be increased by lowering the rear end of the conveyer structure.

I claim—

1. In a machine for freeing nuts of their membranes, the combination of membrane loosening means, mechanism for reciprocating slantingly said means, rotary means for advancing the nuts over said membrane loosening means and in engagement therewith, and means for withdrawing the loosened membranes from the nuts.

2. In a machine for freeing nuts of their membranes, the combination of raker bars, means for reciprocating the raker bars, means for moving the nuts over the raker bars and in engagement therewith, and means for withdrawing the loosened membranes from the nuts.

3. In a machine for freeing nuts of their membranes, the combination of raker bars, means for reciprocating the raker bars, means for moving nuts over the raker bars in predetermined direction and in engagement therewith, and suction means for withdrawing the loosened membranes from the nuts.

4. In a machine for freeing nuts of their membranes, the combination of raker bars, means for moving simultaneously certain of said raker bars in a direction different from the direction of movement of the other raker bars, means for continuously advancing nuts over said raker bars and in engagement therewith, and means for withdrawing the membranes loosened by the action of said raker bars on the nuts from the nuts.

5. In a machine for freeing nuts of their membranes, the combination of sets of raker bars, means for moving the raker bars in one set in a direction opposite to the direction of the raker bars of the other set, means for continuously moving nuts in a predetermined direction over the two sets of raker bars and in engagement therewith, and means for withdrawing the loosened membranes from the nuts.

6. In a machine for freeing nuts of their membranes, the combination of a pair of sets of raker bars, the bars in one set being alternately arranged with respect to the bars of the other set, means for simultaneously reciprocating the two sets in opposite directions, means for moving nuts over said raker bars and in engagement therewith, and means for removing the membranes loosened from the nuts.

7. In a machine for freeing nuts of their membranes, the combination of a pair of sets of raker bars, means for reciprocating the two sets in opposite directions, the raker bars in one set being separated from the raker bars in the other set by interspaces, means for moving nuts over the raker bars and in engagement therewith, and means for withdrawing the loosened membranes from the nuts through said interspaces.

8. In a machine for freeing nuts of their membranes, the combination of two sets of raker bars, a common support for each set, means for simultaneously imparting reciprocating movement in opposite direction to each of the supports, and means for advancing nuts over the raker bars and in engagement therewith.

9. In a machine for freeing nuts of their membranes, the combination of two sets of raker bars, common means at each end of each set for supporting the raker bars, means for reciprocating said sets simultaneously in opposite directions, and means for moving nuts over said raker bars and in engagement therewith.

10. In a machine for freeing nuts of their membranes, the combination of raker bars arranged in a plurality of sets, a plurality of supports for each set, means for reciprocating said supports simultaneously in opposite direction, anti-friction devices common to supports of different sets and with which said supports are in engagement, and means for advancing nuts over said raker bars and in engagement therewith.

11. In a machine for freeing nuts of their membranes, the combination of raker bars, means for reciprocating said raker bars, means for feeding nuts to said bars, and means for imparting rolling movement to the nuts over said bars.

12. In a machine for freeing nuts of their membranes, the combination of reciprocating raker bars, means for feeding nuts to said raker bars at one end thereof, a brush disposed above said bars and adapted to contact the nuts on said bars, and means for imparting movement to said brush.

13. In a machine for freeing nuts of their membranes, the combination of reciprocating raker bars, means for feeding nuts to said raker bars at one end thereof, a brush disposed above said raker bars and adapted to contact said nuts, and means for imparting rotary movement to said brush.

14. In a machine for freeing nuts of their membranes, the combination of reciprocating raker bars, means for feeding nuts to said raker bars, and a brush disposed above said raker bars and having bristles of sufficient length to contact the nuts, the bristles not being long enough to come into engagement with the surface of said raker bars.

15. In a machine for freeing nuts of their membranes, the combination of reciprocating raker bars, means for feeding nuts to said raker bars, and a beating device for intermittently advancing the nuts on the surface of said raker bars.

16. In a machine for freeing nuts of their membranes, the combination of reciprocating raker bars, means for feeding nuts to said raker bars, and a rotary brush disposed above said raker bars and having bristles of non-uniform length, whereby through the rotation of the brush, through the longer bristles, a beating action is exerted upon the nuts on the bars.

17. In a machine for freeing nuts of their membranes, the combination of reciprocating raker bars and a rotary brush disposed above said raker bars, said rotary brush having sections of shorter bristles alternating with sections of longer bristles, the sections of longer bristles being adapted to contact the nuts traveling on the raker bars.

18. In a machine for freeing nuts of their membranes, the combination of reciprocating raker bars, means for advancing nuts longitudinally of said raker bars, a rotary brush disposed above said raker bars and having its axis transversely with respect to the same, a shaft supporting said rotary brush, and removable bearings for said shaft.

19. In a machine for freeing nuts of their membranes, the combination of a plurality of reciprocating raker bars, a pair of rotary brushes disposed above said raker bars and transversely arranged with respect thereto, and means between said brushes for preventing action of said raker bars upon the nuts while traveling from one brush to the other brush.

20. In a machine for freeing nuts of their membranes, the combination of a plurality of raker bars, means for moving nuts longitudinally of said raker bars and in engagement therewith, an air conduit extending over the entire effective length of said raker bars, and means for producing negative pressure in said air conduit.

21. In a machine for freeing nuts of their membranes, the combination of a plurality of reciprocating raker bars separated from each other by longitudinal interspaces, means for advancing nuts over said raker bars and in engagement therewith, and an air conduit extending over the entire length of said interspaces and in communication therewith.

22. In a machine for freeing nuts of their membranes, the combination of reciprocating raker bars, means for moving the nuts in engagement with said raker bars, a stationary conduit coextensive with said raker bars, said raker bars being separated from each other by interspaces and the conduit communicating with said interspaces, and means for reducing the air pressure in said conduit.

23. In a machine for freeing nuts of their membranes, the combination of reciprocating raker bars, means for feeding nuts to said raker bars, means for moving the nuts along the raker bars, and air suction means for maintaining said nuts in engagement with said raker bars.

24. In a machine for freeing nuts of their membranes, the combination of reciprocating raker bars, means for feeding nuts to said raker bars, means for advancing the nuts along the raker bars, air suction means for maintaining the nuts during their travel in engagement with the raker bars, and means for regulating the force with which the nuts are held in engagement with the raker bars.

25. In a machine for freeing nuts of their membranes, the combination of a plurality of reciprocating members provided with teeth adapted to loosen the membranes, and air suction means subjacent said reciprocating members and acting upon the major portion thereof to maintain the nuts in engagement with the teeth.

26. In a machine for freeing nuts of their membranes, the combination of toothed bars, means for imparting reciprocating movement to the bars, an air conduit in communication with the interspace between the bars, a suction device acting upon the air conduit, and shutters in the conduit for regulating the inlet of air into the conduit.

27. In a machine for freeing nuts of their membranes, the combination of a mechanism for loosening the membranes, including reciprocating raker bars, and means for angularly adjusting the position of said mechanism to accelerate or retard the travel of the nuts in engagement with said mechanism.

28. In a machine for freeing nuts of their membranes, the combination of reciprocating raker bars separated from each other by interspaces, means for feeding nuts to said raker bars, a conduit in communication with said interspaces, and means for angularly adjusting the position of said conduit.

29. In a machine for freeing nuts of their membranes, mechanism for loosening the membranes, means for feeding nuts to said mechanism, means for conveying the nuts along said mechanism and in engagement therewith, means for withdrawing the loosened membranes from the nuts, and means for jointly adjusting the angular position of said mechanism, the conveyer, and the withdrawing means to accelerate or retard the travel of the nuts while in engagement with said mechanism.

30. In a machine for freeing nuts of their membranes, a plurality of movable raker elements, said raker elements having teeth slanting from the tip in opposite directions and having slots extending from the tip of the teeth into the raker elements.

31. In a machine for freeing nuts of their membranes, the combination of a plurality of transverse members, means for imparting reciprocating movement to said transverse members, said transverse members being arranged in pairs, each of the transverse members being provided with slots and the slots in one member of each pair being in longitudinal alinement with the slots in the companion member, raker bars seated in said slots, and means for rigidly holding said raker bars in operative position in said transverse members.

32. In a machine for freeing nuts of their membranes, the combination of a drive shaft, eccentrics mounted on said drive shaft, raker bars, means connected with said eccentrics for reciprocating said raker bars, movable brushes adapted to contact the nuts fed to said raker bars, and means controlled from the same drive shaft for imparting movement to said brushes.

33. In a machine for freeing nuts of their membranes, the combination of a drive shaft, raker bars, means on said drive shaft for imparting reciprocating movement to said raker bars, said raker bars being adapted to loosen the membranes of nuts fed to said raker bars, a suction device for withdrawing the loosened membranes from the nuts, and means controlled by the same drive shaft for operating said suction device.

In testimony whereof I affix my signature in the presence of two witnesses.

FRED TOWNSEND.

Witnesses:
 Lieut. LESLIE OPIE READ,
 PHILO READ.